United States Patent [19]
O'Loughlin

[11] Patent Number: 4,580,038
[45] Date of Patent: Apr. 1, 1986

[54] INDICATING AND CONTROL APPARATUS FOR A PORTABLE HEATING APPLIANCE
[75] Inventor: Thomas M. O'Loughlin, Milford, Conn.
[73] Assignee: Black & Decker, Inc., Newark, Del.
[21] Appl. No.: 687,843
[22] Filed: Dec. 31, 1984
[51] Int. Cl.⁴ .............................................. H05B 1/02
[52] U.S. Cl. .................................... 219/506; 219/252; 219/501; 219/507; 219/494; 340/815.01; 340/815.03; 340/588
[58] Field of Search ............... 219/251, 252, 501, 506, 219/492, 497, 507–509; 340/584, 588, 815.01; 236/46 F

[56] References Cited
U.S. PATENT DOCUMENTS

| | | |
|---|---|---|
| 3,943,332 | 3/1976 | Marsh . |
| 4,074,719 | 2/1978 | Semm ................................ 219/506 |
| 4,189,855 | 2/1980 | Robinson . |
| 4,203,101 | 5/1980 | Towsend . |
| 4,217,482 | 8/1980 | Wadia . |
| 4,233,498 | 11/1980 | Payne et al. ..................... 219/506 |
| 4,278,873 | 7/1981 | Petrides . |
| 4,317,987 | 3/1982 | Fieldman ........................... 219/506 |
| 4,322,594 | 3/1982 | Brisson . |
| 4,347,248 | 8/1982 | Conrad et al. . |
| 4,369,352 | 1/1983 | Bowles . |
| 4,418,268 | 11/1983 | Munshaw ........................... 219/506 |

FOREIGN PATENT DOCUMENTS
0605378 7/1948 United Kingdom ............... 219/506

Primary Examiner—M. H. Paschall
Attorney, Agent, or Firm—Finnegan, Henderson, Farabow, Garrett & Dunner

[57] ABSTRACT

An iron includes a heater, a thermostat, a temperature select knob, a READY indicator, a WAIT indicator, an audible transducer, a relay, a motion detector, and a microprocessor-based electronic control circuit. Whenever the temperature select knob is moved, an interrupting signal is supplied to the microprocessor which causes the WAIT indicator to be illuminated and the READY indicator to be extinguished. Following this operation, the READY indicator is illuminated, the WAIT indicator extinguished and a single beep produced by the audible transducer whenever the thermostat deenergizes the heater. If the READY indicator is illuminated a total of ten minutes without the motion detector sensing movement of the iron, a ten-beep signal is produced by the transducer. If the READY indicator is illuminated for a total of twelve minutes without the iron being moved, the electronic control circuit deenergizes the relay to produce an automatic shut-off of the iron.

17 Claims, 11 Drawing Figures

COMPLETE SYSTEM FLOWCHART

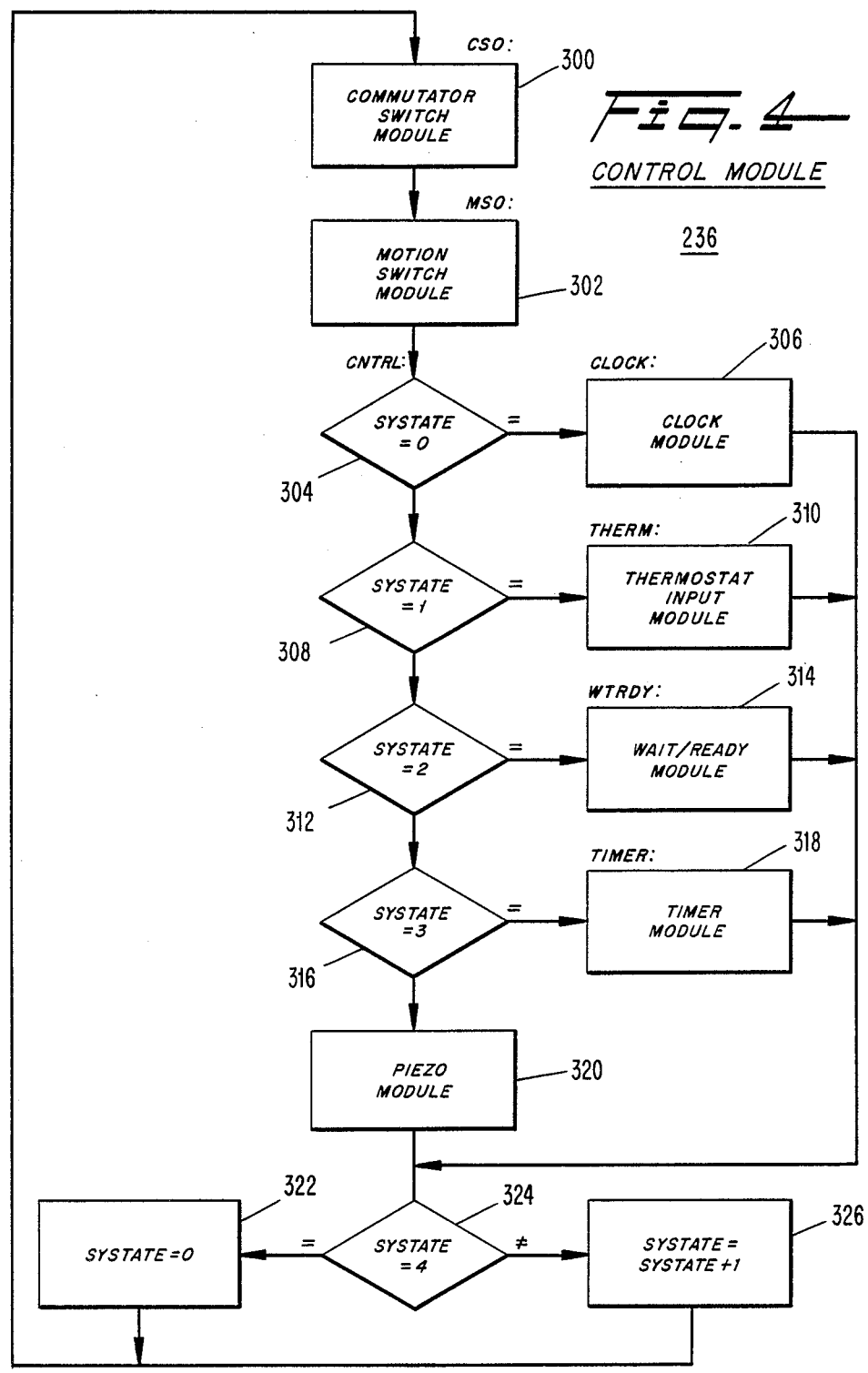

COMMUTATOR SWITCH MODULE

MOTION SWITCH MODULE

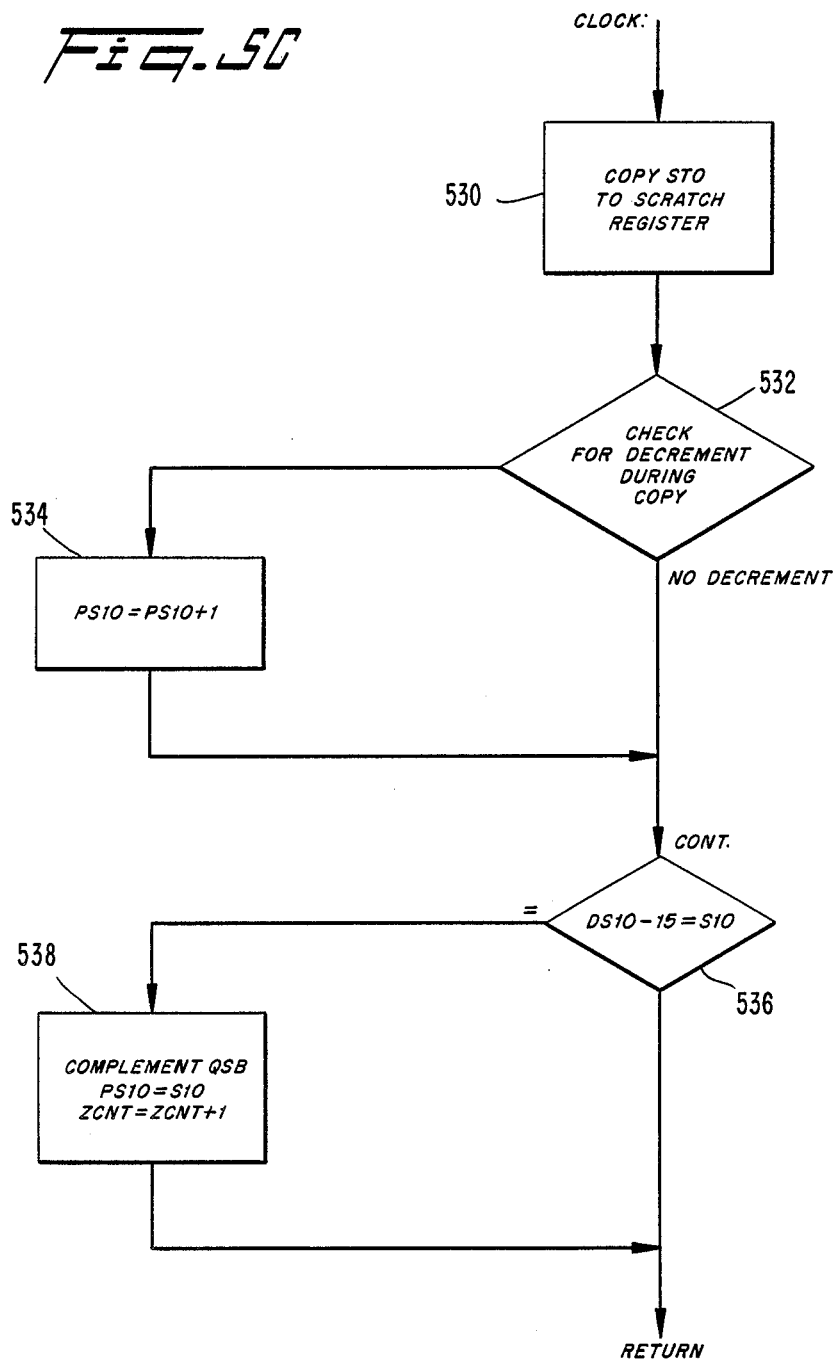

THERMOSTAT MODULE

WAIT/READY MODULE

TIMER MODULE

PIEZO MODULE

INDICATING AND CONTROL APPARATUS FOR A PORTABLE HEATING APPLIANCE

BACKGROUND OF THE INVENTION

The invention relates to indicating and control apparatus for appliances and, more particularly, to such apparatus which provides automatic shut-off and audible and visible indicating signals.

In appliances including variable-temperature heaters, it is desirable to include features which provide increased safety and convenience to the user. For example, it is known in the art to provide appliances including variable-temperature heaters having automatic shut-off devices. Furthermore, it is known in the art to provide appliances which include various audible and visible indications to the user of the temperature status of the appliance. However, prior art implementations of these features sometimes yielded inconsistent indicating signals which confused the user and resulted in shut-off of the appliance in an annoying and inconvenient manner. Moreover, when the user selected a different desired temperature, inaccurate "ready" indications would sometimes occur. Thus, the prior art has failed to provide such features in a manner which yielded the required degree of safety and operating convenience. It is therefore desirable to provide an appliance having a variable temperature heater which will provide to the user a simple positive audible and visible "ready" signal indicating that the temperature of the appliance renders the appliance suitable for use and wherein a "ready" indication will be provided following a change in desired temperature only when the associated appliance reaches the newly selected temperature. It is further desirable to provide an appliance including the safety feature of an automatic shut-off after a predetermined period of nonuse, with the shut-off feature preceded by a signal indicating that shut-off is about to occur.

SUMMARY OF THE INVENTION

In accordance with the principles of the present invention, indicating apparatus for an associated appliance is provided comprising means for selecting a desired operating parameter of the associated appliance, and means for controlling operation of the appliance, the control means comprising an input terminal and operable upon interruption of a signal to the input terminal to generate an indication signal. The apparatus further comprises means connected to the input terminal and to the selecting means for interrupting a signal to the input terminal whenever the selecting means is changed. In a preferred embodiment of the invention there is provided a variable-temperature heating appliance comprising a heater, means for selecting a desired temperature for the appliance, and means for detecting changes in the temperature selecting means and for generating a first output signal whenever the temperature selecting means is changed by more than a predetermined amount. A preferred embodiment of the invention further comprises means for energizing the heater when the appliance is below the desired temperature and for deenergizing the heater when the appliance is above the desired temperature, and means for detecting transitions of the energizing means from an energizing condition to a deenergizing condition and for generating a second output signal when the energizing means changes from energizing the heater to deenergizing the heater. A preferred embodiment of the invention further comprises means connected to the change detecting means and the transition detecting means for generating a WAIT indication signal upon receipt of the first output signal and for generating a READY indication signal upon receipt of the second output signal.

In another preferred embodiment of the invention, indicating apparatus is provided for an associated appliance having a variable temperature heater. The apparatus comprises means for selecting a desired temperature for the associated appliance and means for detecting changes in the temperature selecting means and for generating a first output signal whenever the temperature selecting means is changed by more than a predetermined amount.

The apparatus also comprises means for sensing the temperature of the associated appliance and for generating a temperature signal indicative of whether the associated appliance is above or below the desired temperature. The apparatus further comprises means for detecting transitions of the temperature signal and for generating a second output signal when the sensing means senses that the temperature of the associated appliance has changed from below the desired temperature to above the desired temperature, and means connected to the change detecting means and the transition detecting means for generating a WAIT indication signal upon receipt of the first output signal and for generating a READY indication signal upon receipt of the second output signal.

To provide additional safety and convenience, the invention may further comprise means for detecting use of the associated appliance and for generating a use signal upon detection of the use of the appliance, means for deenergizing the appliance, and a timer circuit comprising means for generating regular clock pulses and an enable input terminal connected to the indication signal generating means, a reset input terminal connected to the use detecting means, and an output terminal connected to the deenergization means. The timer circuit is enabled by the READY indication signal and accumulates clock pulses when the READY indication signal is being generated. The timer circuit generates an output signal to operate the deenergization means when the accumulated pulse count reaches a first predetermined limit value and zeroes the accumulated pulse count upon receipt of the use signal. The timer circuit may also generate an output signal to activate an audible transducer to produce an audible indication signal when the accumulated pulse count reaches a second predetermined limit value less than the first predetermined limit value.

BRIEF DESCRIPTION OF THE DRAWINGS

FIG. 4 is a detailed logic flow diagram of the iron control program shown in FIG. 3; and FIGS. 5A–5G are detailed logic flow diagrams of modules of the iron control program shown in FIG. 4.

DESCRIPTION OF THE PREFERRED EMBODIMENT

Reference will now be made in detail to the present preferred embodiment of the invention, an example of which is illustrated in the accompanying drawings.

Figure 1:
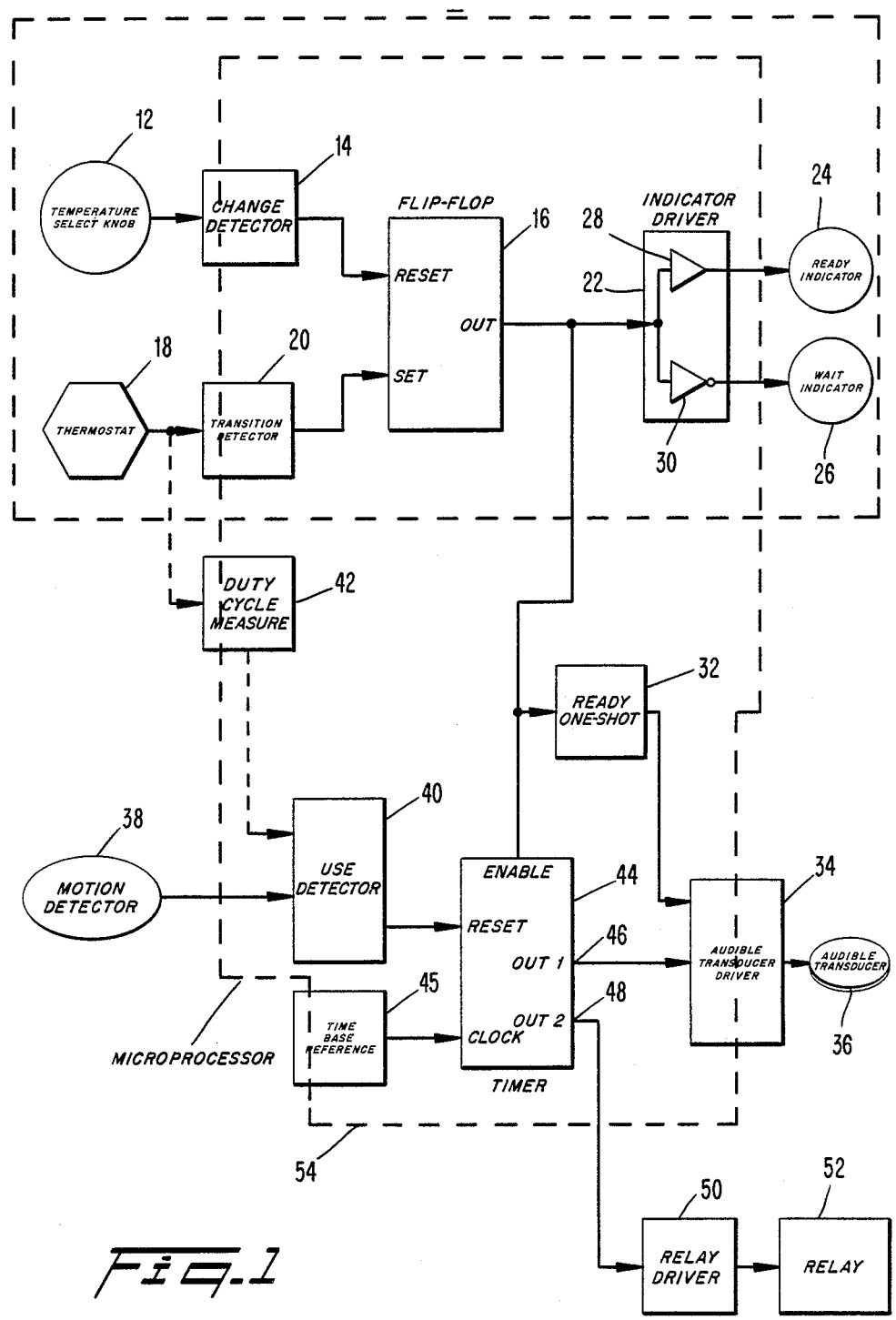
FIG. 1 is a schematic block diagram of a preferred embodiment of the present invention.

A preferred embodiment of the invention provides indicating and control apparatus for a variable-temperature appliance as shown in FIG. 1. Referring now to FIG. 1, an indicating and control circuit 10 for an electric iron includes means for selecting a desired temperature for the associated appliance. As embodied herein, the temperature selecting means comprises a temperature select knob 12 by which the user specifies the desired operating temperature of the iron. The iron, of course, includes a sole plate and handle housing which support and enclose the various components of the iron. Since such physical features are well-known to those skilled in the art, their construction will not be discussed in detail.

In accordance with the invention, there is also provided means for detecting changes in the temperature selecting means and for generating a first output signal whenever the temperature selecting means is changed by more than a predetermined amount. As embodied herein, the detecting means comprises a change detector 14 connected to the temperature select knob 12. Whenever temperature select knob 12 is changed, change detector 14 generates a signal to the reset terminal of a flip-flop circuit 16.

The invention also includes means for sensing the temperature of the associated appliance and for generating a temperature signal indicative of whether the associated appliance is above or below the desired temperature. As embodied herein, the temperature sensing means comprises a thermostat 18 which energizes and deenergizes the heater of the iron and produces an output signal indicative of whether the associated iron heater is either energized or deenergized.

The invention further includes means for detecting transitions of the temperature signal and for generating a second output signal when the sensing means senses that the temperature of the associated appliance has changed from below the desired temperature to above the desired temperature. As embodied herein, the transition detecting means comprises a transition detector 20 which generates an output signal whenever thermostat 18 changes from an energized condition to a deenergized condition. The output signal from transition detector 20 is provided to a SET terminal of flip-flop 16.

The invention also includes means connected to the change detecting means and the transition detecting means for generating a WAIT indication signal upon receipt of the first output signal and for generating a READY indication signal upon receipt of the second output signal. As embodied herein, the indication signal generating means includes flip-flop 16, an indicator driver circuit 22, a READY indicator LED 24, and a WAIT indicator LED 26. Flip-flop 16 is a standard RS flip-flop having digital SET and RESET inputs, and a binary output. Upon receipt of a logic HI pulse at the SET terminal, the output terminal of flip-flop 16 assumes and maintains a logic HI output. Upon receipt of a logic HI pulse to the RESET terminal of flip-flop 16, the output of flip-flop 16 assumes and maintains a logic LO output.

Indicator driver circuit 22 includes an amplifier 28 and an inverting amplifier 30 having their inputs connected in parallel to the output of flip-flop 16. The output of amplifier 28 is connected to READY LED 24 and the output of inverting amplifier 30 is connected to WAIT LED 26. It can be seen, therefore, that the illumination states of READY LED 24 and WAIT LED 26 are complementary; that is, when READY LED 24 is lighted, WAIT LED 26 is extinguished and when READY LED 24 is extinguished, WAIT LED 26 is lighted.

The invention also includes means connected to the flip-flop output terminal for generating an audible signal when the flip-flop generates the READY signal. As embodied herein, the audible signal generating means includes READY one-shot 32, audible transducer driver 34, and audible transducer 36. READY one-shot 32 is connected between the output of flip-flop 16 and audible transducer driver 34. The output of audible transducer driver 34 is connected to audible transducer 36 which produces an audible output signal when supplied with an electrical input signal. READY one-shot 32 detects a transition of the output of flip-flop 16 from a logic LO to a logic HI condition and produces a logic HI pulse output signal to audible transducer 34 which in turn supplies an electrical pulse signal to audible transducer 36 to produce a short beep.

The operation of the above described portion of indicating and control circuit 10 will now be explained. Assume that the circuit 10 is in a condition in which READY LED 24 is illuminated and WAIT LED 26 is extinguished. When a user selects a new desired operating temperature for the associated iron, temperature select knob 12 is changed. Change detector 14 accordingly produces a logic HI signal to the RESET terminal of flip-flop 16. This causes the output terminal of flip-flop 16 to change from a logic HI condition to a logic LO condition, thus operating indicator driver 22 to extinguish READY LED 24 and illuminate WAIT LED 26. Assume that the user has selected a higher operating temperature for the iron. Thermostat 18 will energize the heater of the associated iron to bring about the desired temperature increase. The temperature signal supplied by thermostat 18 will also indicate a change from a deenergized condition of thermostat 18 to an energized condition. However, this change will be ignored by transition detector 20. After a period of time, the temperature of the iron will increase under the influence of the iron heater and reach the desired operating temperature as specified by the user through temperature select knob 12. At this point, thermostat 18 causes the iron heater to be deenergized, and the temperature signal supplied by thermostat 18 will reflect a transition from an energized to a deenergized condition. Transition detector 20 will generate a logic HI signal upon detection of the energized to deenergized transition of the heater and will supply this signal to the SET terminal of flip-flop 16. The output terminal of flip-flop 16 will change from a logic LO condition to a logic HI condition, illuminating READY LED 24 and extinguishing WAIT LED 26. The logic LO to logic HI transition of the output terminal of flip-flop 16 will also cause READY one-shot 32 to generate a pulse which is amplified by audible transducer driver 34 and produce a short beep signal at the same time that READY LED 24 is illuminated. The user will thus be informed that the iron has now reached the newly selected temperature and is ready for use.

If the user changes the temperature select knob to select a new desired operating temperature which is lower than the current desired operating temperature, thermostat 18 deenergizes the heater. However the transition of the temperature signal occurs simultaneously with a change in the temperature select knob, causing pulses to arrive simultaneously at the RESET and SET terminals of flip-flop 16. Under these conditions, the RESET terminal takes precedence. A logic LO signal thus appears at the output of flip-flop 16, causing WAIT LED 26 to be lighted and READY LED 24 to be extinguished. When the iron cools to below the newly selected temperature, the iron heater is energized. This transition is ignored by transition detector 20, however. When the iron temperature rises to the new desired temperature, the heater is deenergized. Thermostat 18 then generates a signal indicating this transition, and transition detector 20 supplies a signal to the SET terminal of flip-flop 16 to cause the READY LED 24 to be lighted and WAIT LED 26 to be extinguished.

The invention also includes means for detecting use of the associated appliance and for generating a use signal upon detection of use of the associated appliance. As embodied herein, the use detecting means comprises a motion detector 38 and a use detector 40. Motion detector 38 produces an electrical signal indicating that the iron has been moved. Use detector 40 in turn generates a signal at its output terminal.

In an alternative embodiment, a duty cycle measuring circuit 42 may be provided in place of motion detector 38. As can be seen in FIG. 1, the temperature signal from thermostat 18 is supplied to duty cycle measuring circuit 42. Since the duty cycle of thermostat 18 is dependent upon whether the iron is in an idle condition or is actually being used, the output of duty cycle measuring circuit 42 can be employed by use detector 40 to produce an output signal indicative of use of the iron.

The output of use detector 40 is supplied to the RESET terminal of a timer circuit 44. Timer circuit 44 also includes an enable input terminal, a clock input terminal, and first and second output terminals 46 and 48. A time base reference 45 which produces a series of regular clock pulses is connected to the clock input terminal of timer circuit 44.

The output terminal of flip-flop 16 is connected to the enable input terminal of timer circuit 44. First output terminal 46 of timer circuit 44 is connected to audible transducer driver 34, and second output terminal 48 of timer circuit 44 is connected to means for deenergizing the associated appliance. As embodied herein, the deenergizing means comprising a relay driver 50 and a relay 52 which provides on-off control of electric energy to the entire iron.

Time base reference 45 provides regular clock pulses to timer 44. These clock pulses are accumulated by timer 44 whenever a logic HI signal from flip-flop 16 appears at the enable terminal of timer circuit 44. The accumulated pulse count is zeroed by timer circuit 44 whenever a logic HI signal from use detector 40 appears at the RESET terminal of timer circuit 44. If the accumulated pulse count reaches a first predetermined limit value representing, for example, 10 minutes, timer circuit 44 generates a series of ten one-fourth second pulses at output terminal 46. This series of pulses is supplied through audible transducer driver 34 to cause audible transducer 36 to produce a series of ten beeps.

If, before a RESET signal is provided by use detector 40, the accumulated pulse count should reach a second predetermined limit value higher than the first predetermined limit value representing, for example, 12 minutes, then timer circuit 44 produces a signal at output terminal 48. This signal causes relay driver 50 to operate relay 52 and deenergize the iron. It can be seen, therefore, that clock pulses are accumulated by timer circuit 44 whenever the iron is in a READY condition. This accumulated pulse count is zeroed, however, whenever the iron is used, as determined by motion detector 30 and use detector 40. However, if the iron has remained in the READY condition for a total of 10 minutes without being used, a distinctive audible signal is provided to the user. At this point, the user may return to the iron and use the iron without the inconvenience of an automatic shut-off occurring when it is not desired. However, if the user does not respond to the audible warning, then after an additional period, the circuit 10 produces an automatic shut-off of the iron.

Figure 2:
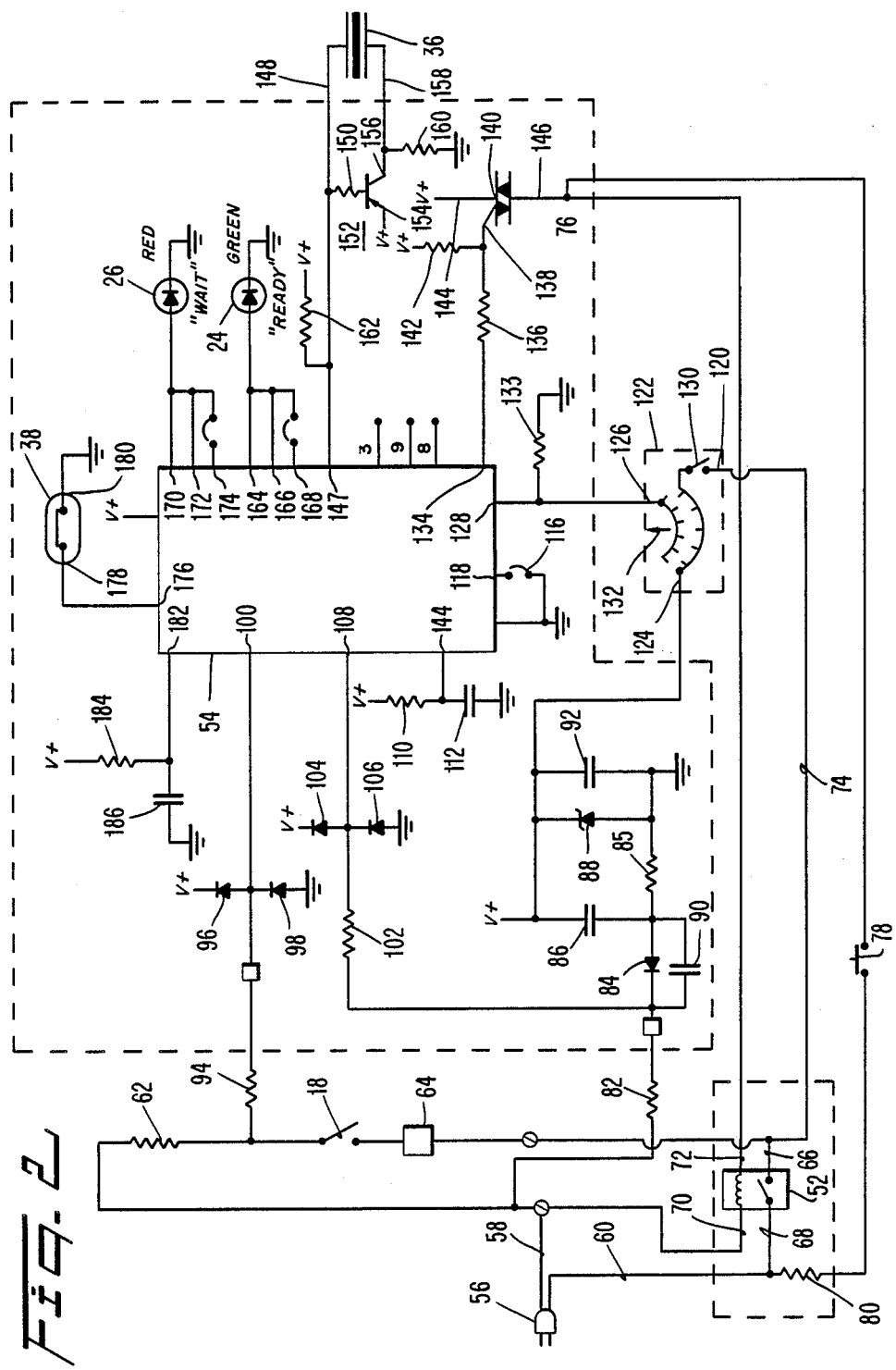
FIG. 2 is an electrical schematic diagram of an implementation of the preferred embodiment shown in FIG. 1, utilizing a microcomputer.

The embodiment of FIG. 1 may be implemented using conventional discrete circuitry. However, increased reliability and decreased cost can be obtained by implementing the functions of the embodiment shown in FIG. 1 using a microcomputer. As shown in FIG. 2, the functions of various elements of the embodiment of FIG. 1 are performed by a microcomputer 54. Microcomputer 54 in the preferred embodiment comprises a type COP 411 L microcomputer manufactured by the National Semiconductor Corporation. This microcomputer includes a central processing unit, RAM memory, read-only memory for storing computer operating instructions to be described in greater detail, an oscillator for generating clock pulses, and high current output ports capable of directly driving various electronic components such as bi-polar transistors and light emitting diodes. Various other electronic apparatus could be utilized in place of the specific microcomputer herein described in the preferred embodiment, such as multiple-chip apparatus including separate microprocessors, read-only memory, RAM memory, and high current drivers. However, the specific configuration of such circuitry and its operation are well-known to those skilled in the art and will not be further described.

A detailed electrical schematic diagram of the embodiment is shown in FIG. 2. A standard line cord plug 56 is connected to a pair of line cord leads 58, 60. Line cord lead 58 is connected to one terminal of a resistance heater 62. The other terminal of heater 62 is connected through thermostat 18 and an over temperature limit device 64 to a control terminal 66 of relay 52. The other control terminal 68 of relay 52 is connected to line cord lead 60. Lead 58 is also connected to one terminal 70 of the operating coil of relay 52. The other terminal 72 of the coil of relay 52 is connected over a lead 74 through a junction 76 to one terminal of a momentary contact start switch 78. A detailed description of start switch 78 is contained in copending U.S. patent application Ser. No. 687,842 filed Dec. 31, 1984 by Harry Albinger and Michael J. Marchetti and assigned to the assignee of the present invention. The disclosure of this application is expressly incorporated herein by reference. The other terminal of switch 78 is connected through a limiting resistor 80 to line cord lead 60 at relay control terminal 68. Line cord lead 58 is also connected to a power supply circuit including a dropping resistor 82, a diode 84 serving as a half-wave rectifier, and a filter capacitor 86. A zener diode 88 provides a regulated voltage V+. Capacitors 90 and 92 provide transient protection for diode 84 and zener diode 88, respectively.

The junction of heater 62 and thermostat 18 is connected through a high impedance resistor 94 to the junction of a pair of diodes 96 and 98. The cathode of diode 96 is connected to the positive power supply voltage V+, the anode of diode 96 is connected to the junction of resistor 94 and the cathode of diode 98, and the anode of diode 98 is connected to circuit common (hereinafter referred to as ground). A temperature signal is thus produced at the junction of diodes 96 and 98 which is supplied to an input port terminal 100 of microcomputer 54. The signal present at terminal 100 is a signal indicative of the energization or deenergization of heater 62, which is in turn indicative of whether the iron is at a temperature below or above the desired temperature. That is, when the terminals of thermostat 18 are closed, thus energizing heater 62, a continuous logic HI signal approximately equal to V+ is present at terminal 100. When thermostat 18 is open, a signal is present at terminal 100 consisting of powerline frequency square-wave pulses having values which alternate between V+ and ground.

A high impedance resistor 102 is connected between the junction of resistor 82 and diode 84 and the junction of a pair of series connected diodes 104 and 106. The diodes 104 and 106 are connected between the positive power supply source V+ and ground in the same manner as diodes 96 and 98. The junction of diodes 104 and 106 is also connected to the serial input terminal 108 of microcomputer 54 and provides a source of line frequency square wave pulses to serial input 108, which serve as clock pulses to microcomputer 54.

A resistor 110 and capacitor 112 are connected in series between the power supply source V+ and ground, and have their junction connected to a terminal 114 to serve as RC circuit for an oscillator internal to microcomputer 54 which generates the time base frequency for microcomputer 54.

A jumper 116 is removably connected between ground and a terminal 118 of microcomputer 54. Jumper 16 serves as a test switch for microcomputer 54 and, when in place to ground, terminal 118 causes diagnostic instructions to be executed by microcomputer 54, in a manner to be more completely described.

Control terminal 66 of relay 52 is connected to a terminal 120 of a combination commutator and power off/on switch 122. A terminal 124 of switch 122 is connected to power source V+ and a terminal 126 of switch 122 is connected to a terminal 128 of microcomputer 54. Combination switch 122 is mechanically connected to temperature select knob 12 (FIG. 1) such that an on/off switch 130 disconnects terminal 120 from terminal 124 when temperature select knob 12 is placed in the off position. In any other position of temperature select knob 12, switch 130 is closed to connect terminal 120 and 124. In addition, a wiper 132 of switch 122 connects terminals 120 and 126 whenever temperature select knob 12 is stationary. However, operation of temperature select knob 12 to select a different desired operating temperature for the iron will cause wiper 132 to alternately connect and disconnect terminals 124 and 126 as knob 12 is moved, thus supplying a pulse signal to a terminal 128 of microcomputer 54 varying between the voltage levels of ground and V+ as temperature select knob 12 is moved. A pull-up resistor 133 is connected between ground and terminal 128. The construction of combination switch 122 is more completely described in the aforementioned copending U.S. patent application Ser. No. 687,842.

An output terminal 134 of microcomputer 54 is connected through a resistor 136 to the control terminal 138 of a triac 140. Control terminal 138 is connected through a resistor 142 to power supply V+. Triac 140 includes output terminals 144 and 146 connected to power supply V+ and junction 76, respectively.

An output terminal 147 of microcomputer 54 is connected to a terminal 148 of audible transducer 36. In a preferred embodiment, audible transducer 36 comprises a piezoelectric audio transducer which produces an audible output signal upon receipt of an electrical input signal. Such transducers are available in commercial quantities from, for example, the Murata Corporation. Terminal 148 is also connected through a resistor 150 to the base terminal of a driver transistor 152. The emitter terminal 154 of transistor 152 is connected to power supply V+ and the collector terminal 156 is connected to the other terminal 158 of transducer 36. Terminal 158 is also connected through a resistor 160 to ground, and terminal 148 is connected through a resistor 162 to power supply V+. Transistor 152 and resistors 150, 160, and 162 serve as a driver for transducer 36 to produce a peak-to-peak voltage across terminals 148 and 158 equal to twice the voltage of power supply V+.

Microcomputer 54 includes output terminals 164, 166, and 168 connected in parallel to the anode of READY LED 24, the cathode of which is connected to ground. In the preferred embodiment, READY LED produces a green light when activated. Terminals 164 and 166 are connected in parallel to the anode of READY LED 24 to provide greater drive current than can be supplied by a single output terminal of microcomputer 54, thus producing a brighter output from READY LED 24. Terminal 168 may additionally be connected in parallel to terminals 164 and 166 if an even brighter indication is required.

In a similar manner, output terminals 170, 172, and 174 are connected in parallel to the anode of WAIT LED 26, the cathode of which is connected to ground. In the preferred embodiment, WAIT LED 26 produces a red light.

Motion detector 38 is connected to input terminal 176 of microcomputer 54. In the preferred embodiment, motion detector 38 comprises a mercury switch including terminals 178 and 180 which are electrically connected in series when a small globule of mercury contacts terminals 178 and 180 due to movement of the iron in which motion detector 38 is situated. Other types of two-terminal motion detectors could, of course, be substituted as will be readily apparent to those skilled in the art.

A power on RESET terminal 182 of microcomputer 54 is connected to the junction of a resistor 184 and a capacitor 186, the other terminals of which are connected to power supply V+ and ground, respectively. When power is first applied to the circuit 10, a signal is supplied to terminal 182 to cause initialization instructions to be executed in microcomputer 54, as will be more completely described.

The operation of the circuit 10 will now be described. When the user removes temperature select knob 12 from the off position, switch 130 closes. However, the circuit is not yet energized since line cord lead 60 is still effectively isolated from the circuit. When start switch 78 is operated, however, line 60 is connected through start switch 78, junction 76, and line 74 to coil terminal 72 of relay 52. Since the other coil terminal 70 of relay 52 is connected to line 58 of the line cord, a circuit thus exists and current flows through the coil of relay 52 to connect relay terminals 66 and 68. A circuit thus is created from line cord 58 through resistor 82, diode 84, resistor 85, zener diode 88, terminal 124, switch 130, terminal 120, relay terminal 66, and relay terminal 68 to line cord 60. power supply V+ is also energized. Microcomputer 54 is also energized and activates output terminal 134.

When a logic LO signal is supplied by microcomputer 54 to output terminal 134, control terminal 138 of triac 140 is activated to render triac 140 conductive. A circuit through the coil of relay 52 thus exists independently of start switch 78 such that line cord lead 58 is connected through the coil of relay 52, junction 76, triac 140, power supply terminal V+, terminal 124 of combination switch 122, switch 130, terminal 120 of combination switch 122, and the closed contacts of relay 52 to line cord lead 60. Thus, when the user releases momentary contact start switch 78 to open the switch, current continues to flow through the coil of relay 52 to maintain energization of the circuit 10 and permit thermostat 18 to alternately energize and deenergize heater 62.

Movement of temperature select knob 12 from the off position is also operative to cause wiper 132 to generate one or more pulses from terminal 126 of combination switch 122 to terminal 128 of microcomputer 54. Microcomputer 54 then activates output terminals 170, 172, and 174 to illuminate WAIT LED 26. At this point, the contacts of thermostat 18 are closed, thus connecting heater 62 across line cord leads 58 and 60 through relay 52.

When the iron reaches the desired temperature as specified by temperature select knob 12, thermostat 18 opens to deenergize heater 62. The square wave signal previously discussed is thus supplied to microcomputer input terminal 100. Microcomputer 54 then simultaneously deenergizes output terminals 170, 172, and 174 and energizes terminals 164, 166, and 168 with a continuous logic HI signal. Microcomputer 54 also energizes output terminal 147 with a 2.5 KHz square wave signal for a period of 0.25 second. This produces a 0.25 second audible output signal from transducer 36 at a frequency of 2.5 KHz.

Upon energization of READY LED 24, microcomputer 54 begins accumulating clock pulses as produced over serial input terminal 108. When the iron is in use, contacts 178 and 180 of motion detector 38 are repeatedly connected. Microcomputer input terminal 176 is thus grounded, causing microcomputer 54 to zero the accumulated count of pulses supplied over input terminal 108. However, if the iron is at rest, pulses continue to accumulate so long as READY LED 24 is illuminated. If the accumulated pulse count reaches 36,000 (10 min.×60 sec./min.×60 pulses/sec.), microcomputer 54 provides ten quarter-second 2.5 KHz pulses over output terminal 147 through transistor 152 to transducer 36. Transducer 36 thus emits ten 0.25 second audible beeps to alert the user to the fact that the iron is still energized. The user is thus able to resume use of the iron without the inconvenience of an undesired automatic shutdown. Such use will activate motion detector 38 to generate a signal to input terminal 176 and cause microcomputer 54 to zero the accumulated pulse count. On the other hand, if the iron continues to remain motionless, allowing pulses to continue to accumulate to a value equal to 43,200, microcomputer 54 will generate a logic HI signal on output terminal 134, deactivating triac 140. The circuit through the coil of relay 52 is thus interrupted, causing the contacts of relay 52 to open and completely deenergize the circuit.

Figure 3:
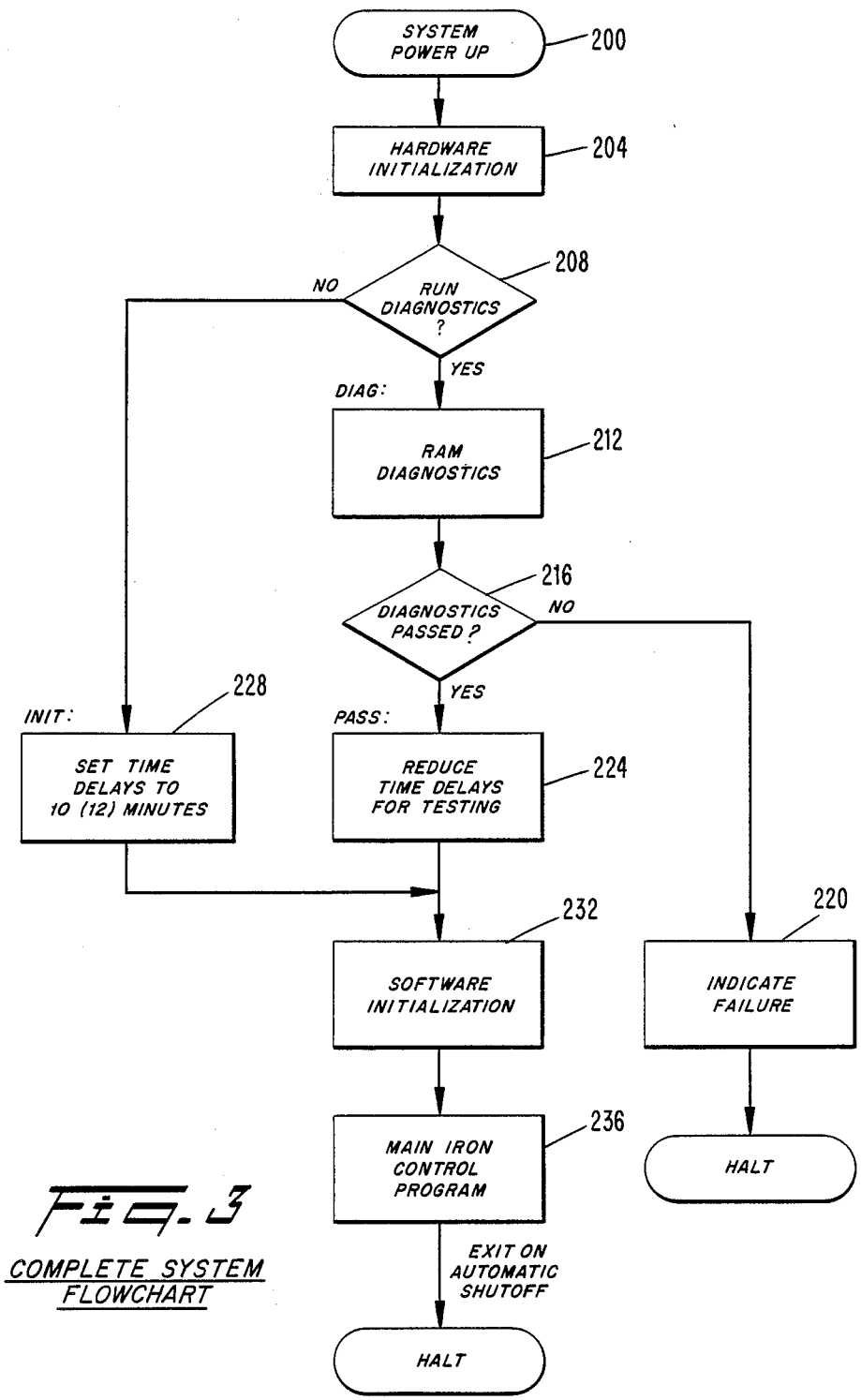
FIG. 3 is a logic flow diagram of computer instructions stored in memory of the microcomputer shown in FIG. 2.

Referring now to FIG. 3, a general logic flow diagram is shown of the computer instructions contained in read-only memory of microcomputer 54. At block 200, system power-up steps are performed, followed by various hardware initialization procedures. These procedures are unique to the specific microcomputer involved, and generally include clearing the RAM memory, setting the output terminals and enabling input terminals to accept pulses.

At block 208, a determination is made of whether terminal 118 is grounded through, for example, jumper 116. If so, various RAM memory diagnostic procedures are performed, in a manner which constitutes no part of the present invention. At block 216, a determination is made of whether the diagnostic tests were passed. If not, a failure indication is provided at block 220 and the program halts.

If the diagnostic tests are passed, the program reduces the time delays of the standard iron control program to avoid the necessity for waiting the entire 10 minute and 12 minute delay times required to generate the ten-beep warning signal and automatic shut-off, respectively.

If terminal 118 is not grounded, indicating that it is not desired to perform tests on the unit, time delays are set at block 228 for ten minutes and 12 minutes for the ten-beep signal and automatic shutdown, respectively. Program flow then continues at block 232 where software initialization procedures are performed. These procedures consist of setting various RAM memory locations and jumping to the main iron control program. The program then advances to the main iron control routine at block 236 which repeatedly cycles until shut-off occurs. The program then halts.

In FIG. 4 there is shown a logic flow diagram of the main iron control program indicated at block 236 of FIG. 3. The main control program of block 236 cycles repeatedly beginning when power is first supplied to the circuit 10 by operation of the ON/OFF switch and continuing until power is removed, either by deactivation of the ON/OFF switch 130 or due to an automatic shut-off. As can be seen in FIG. 4, the main iron control program consists of a number of modules to be described in greater detail. At block 300, the commutator switch module is executed to determine if a change has occurred in temperature select knob 12. Program control advances to block 302 where the motion switch module is executed. In this module, it is determined if motion detector 38 has been activated. At blocks 304 through 320, the clock module, thermostat input module, WAIT/READY module, timer module, and piezo module are alternately executed on every fifth cycle of the main iron control program 236. The specific module to be executed on each cycle is determined by the value of a variable named SYSTATE. At blocks 322-326, the variable SYSTATE is controlled to insure proper execution of the various modules.

Figure 5A:
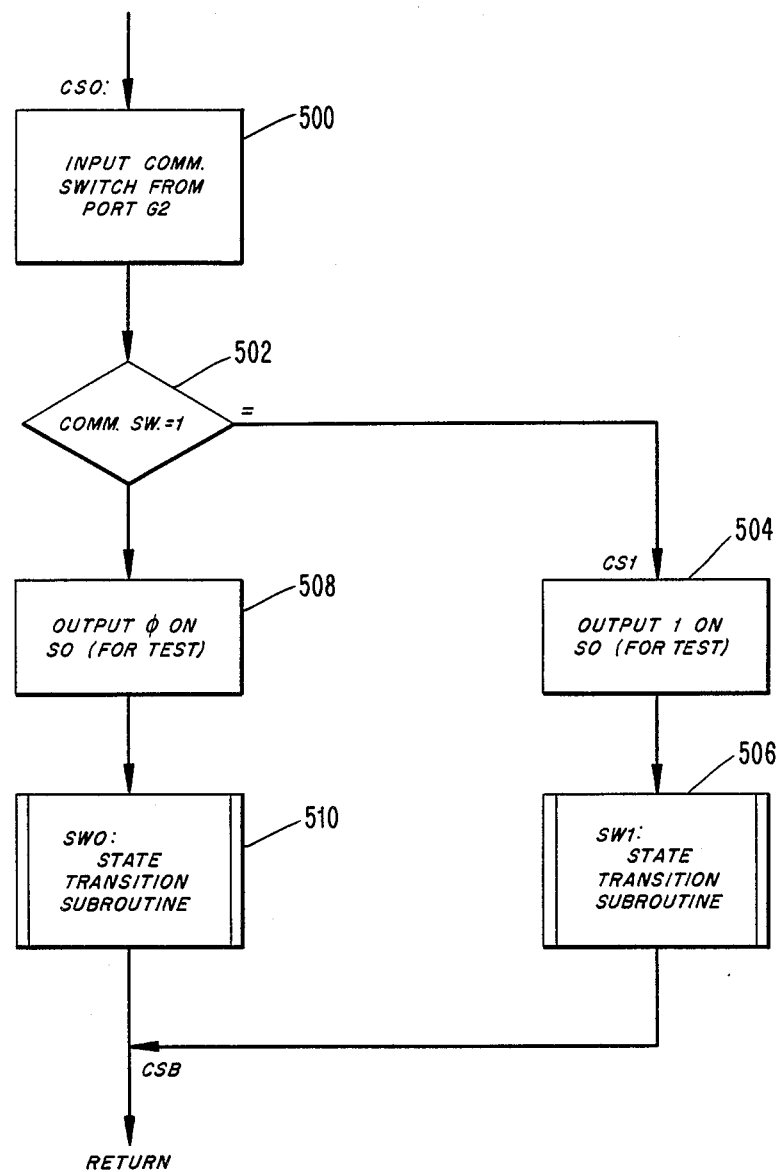

Referring now to FIG. 5A, there is shown a logic flow diagram of the commutator switch module indicated at block 300 of FIG. 4. At block 500, the current state of the commutator switch is read from terminal 128. In blocks 502 through 510, outputs are generated for testing purposes and CSB flag is set if the commutator switch has changed state since the previous execution of the commutator switch module 300. The state transition subroutines SW0 and SW1, indicated at block 510 and block 506, provide an unambiguous indication of whether the input variable supplied thereto has changed state since the previous execution cycle. The subroutines debounce the input signal to eliminate the indeterminant condition of the signal which can result from rapid opening and closing of mechanical switch contacts resulting from only a single activation. The techniques of debouncing provided by the state transition subroutines SW0 and SW1 as indicated in blocks 510 and 506 are well-known to those skilled in the art and will not be discussed herein in greater detail. The output from the commutator switch module is CSB flag which is set by the commutator switch module to a value of logic 1 if the commutator switch input at terminal 128 has changed state since the last execution cycle of the subroutine and is set to a logic 0 if the signal at input terminal 128 has not changed state.

Figure 5B:
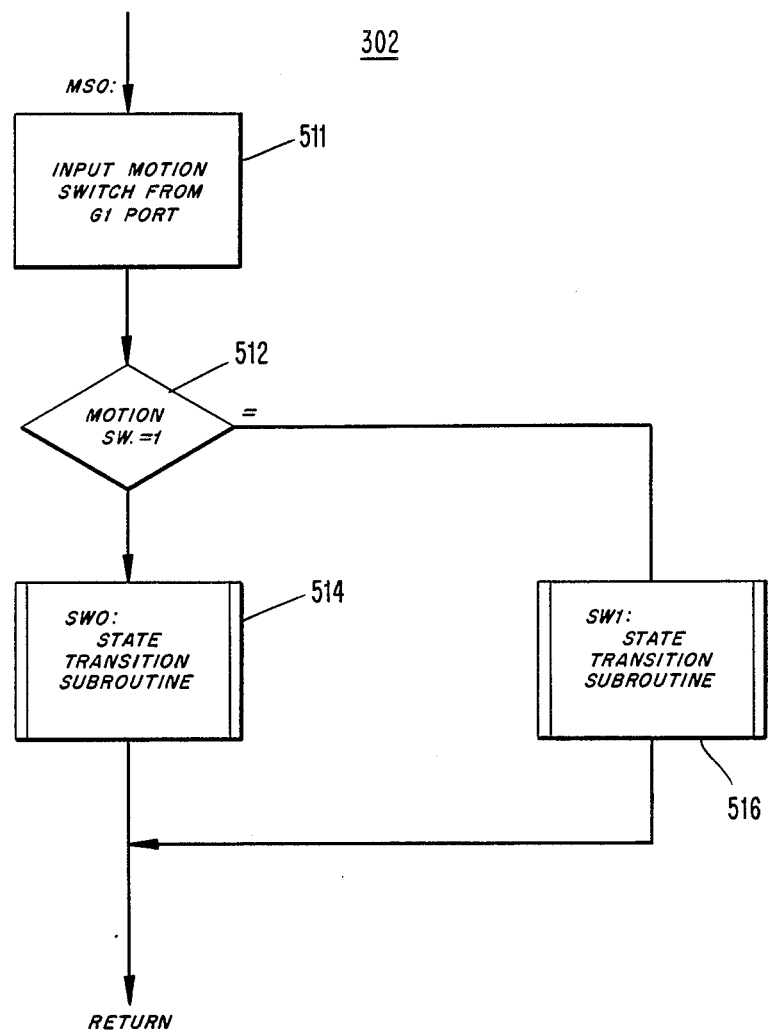

FIG. 5B is a logic flow diagram of the motion switch module of block 302 shown in FIG. 4. At block 511, the current status of the signal at input terminal 176 is read. At blocks 512 to 516, it is determined if this signal has changed state since the previous execution cycle, using the state transition subroutines SW0 and SW1 and an indication is provided on RSTB flag of a change of state of the commutator switch. That is, RSTB flag is set at logic 1 if a change of state has occurred and is set at a logic 0 if no change of state has occurred.

FIG. 5C is a logic flow diagram of the clock module indicated at block 306 of FIG. 4. At block 530, the current status of the signal at input terminal 108 is read. A clock pulse is detected at block 532 and a count PS10 is incremented at 534 if a pulse has occurred. At block 536, the logic checks for 15 clock pulses, indicating the passage of ¼ second. When 15 pulses have occurred, variable QSB is complemented and registers are updated at block 538.

Figure 5D:
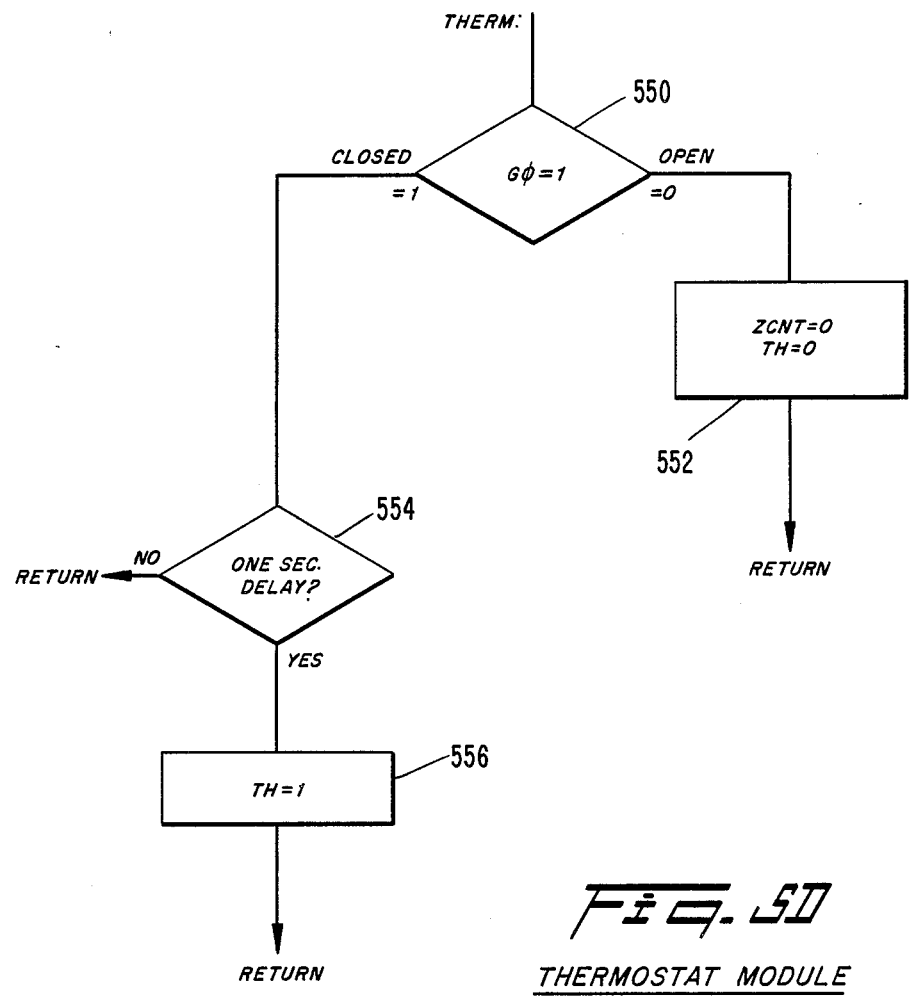

In FIG. 5D there is shown a logic flow diagram of the thermostat input module indicated at block 310 of FIG. 4. At block 550, a determination is made if the current status of the signal input terminal 100 is a logic 1 or a logic 0. If logic 0, program control advances to block 552 wherein ZCNT and TH flags are set equal to 0. If the signal at input terminal 100 is a logic 1, a determination is made at block 554 if at least one second has passed since a logic 0 was detected. If so, this indicates that the thermostat 18 is closed, and flag TH is set equal to 1 at block 556.

Figure 5E:
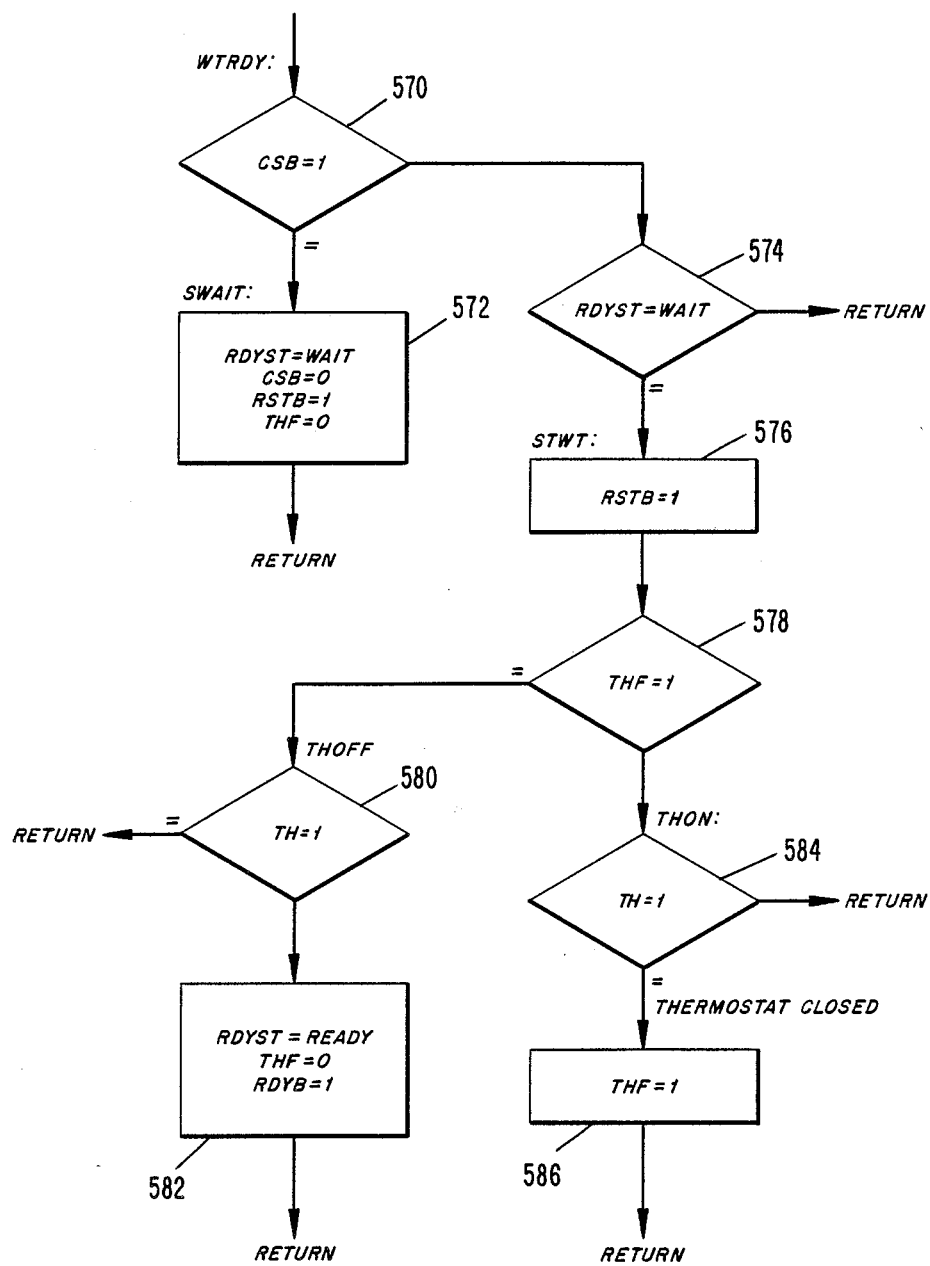

In FIG. 5E, there is shown a logic flow diagram of the WAIT/READY module shown at block 314 of FIG. 4. At block 570, a determination is made if CSB flag is set equal to 1. If so, a flag RDYST is set to a WAIT indication, CSB and THF flags are set equal to 0, and RSTB flag is set equal to 1. If CSB flag at block 570 is determined not to be equal to 1, program control advances to block 574, and determines if RDYST flag is in the WAIT state. If not, the WAIT/READY module is exited. If so, RSTB flag is set equal to 1 at block 576 and a determination made at block 578 if THF flag is equal to 1. If so, a determination is made at block 580 if the TH flag is set equal to 1. If so, the WAIT/READY module is exited. Otherwise, RDYST flag is set to the READY condition, THF flag is set equal to 0, and RDYB flag is set equal to 1 at block 582.

If flag THF is determined not to be equal to 1 at block 578, it is determined at block 584 if the TH flag is set equal to 1. If not, the WAIT/READY module is exited. Otherwise, this is an indication that the thermostat is closed and the THF flag is set at block 586. The WAIT/READY module is then exited.

Figure 5F:
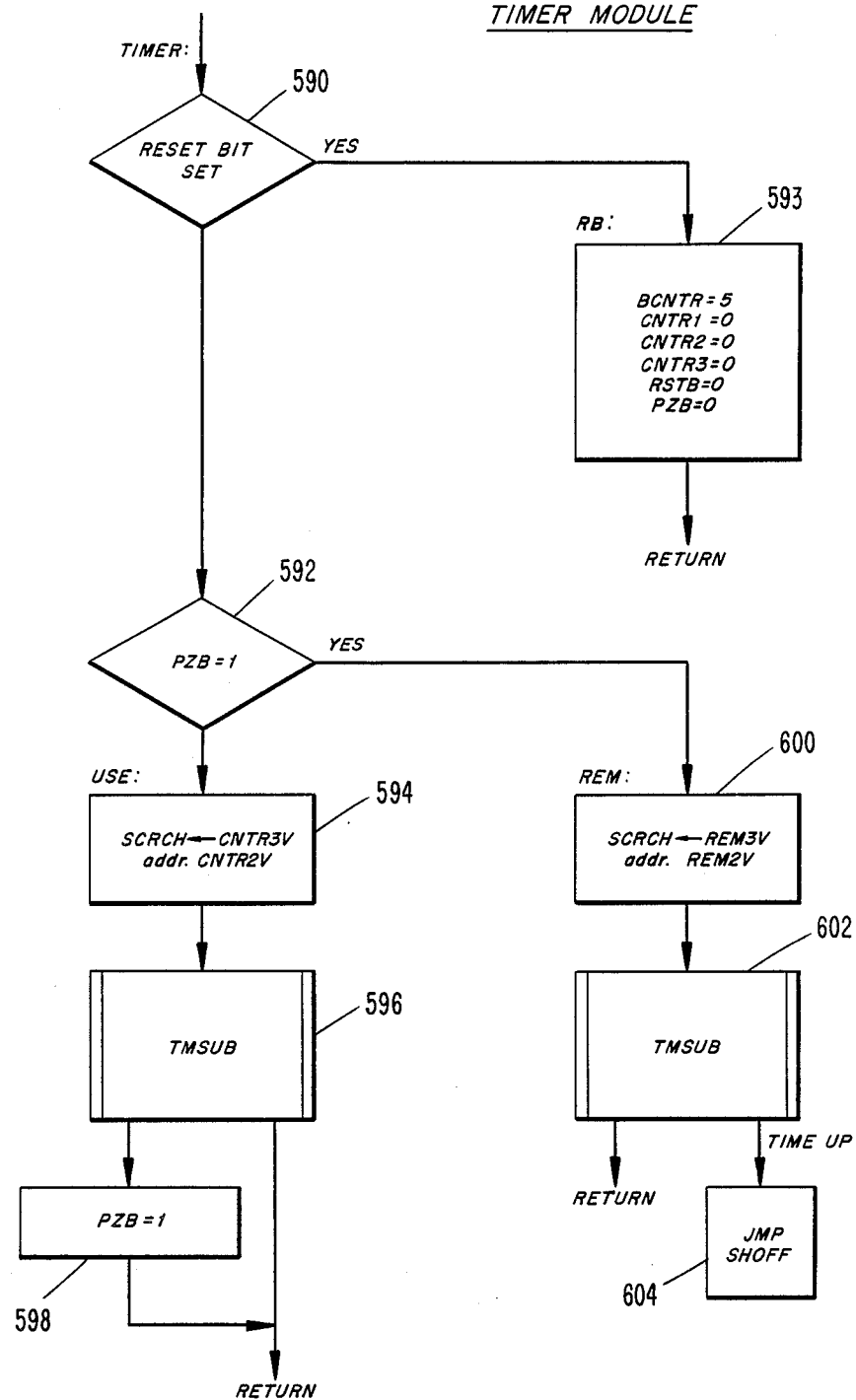
Figure 56:
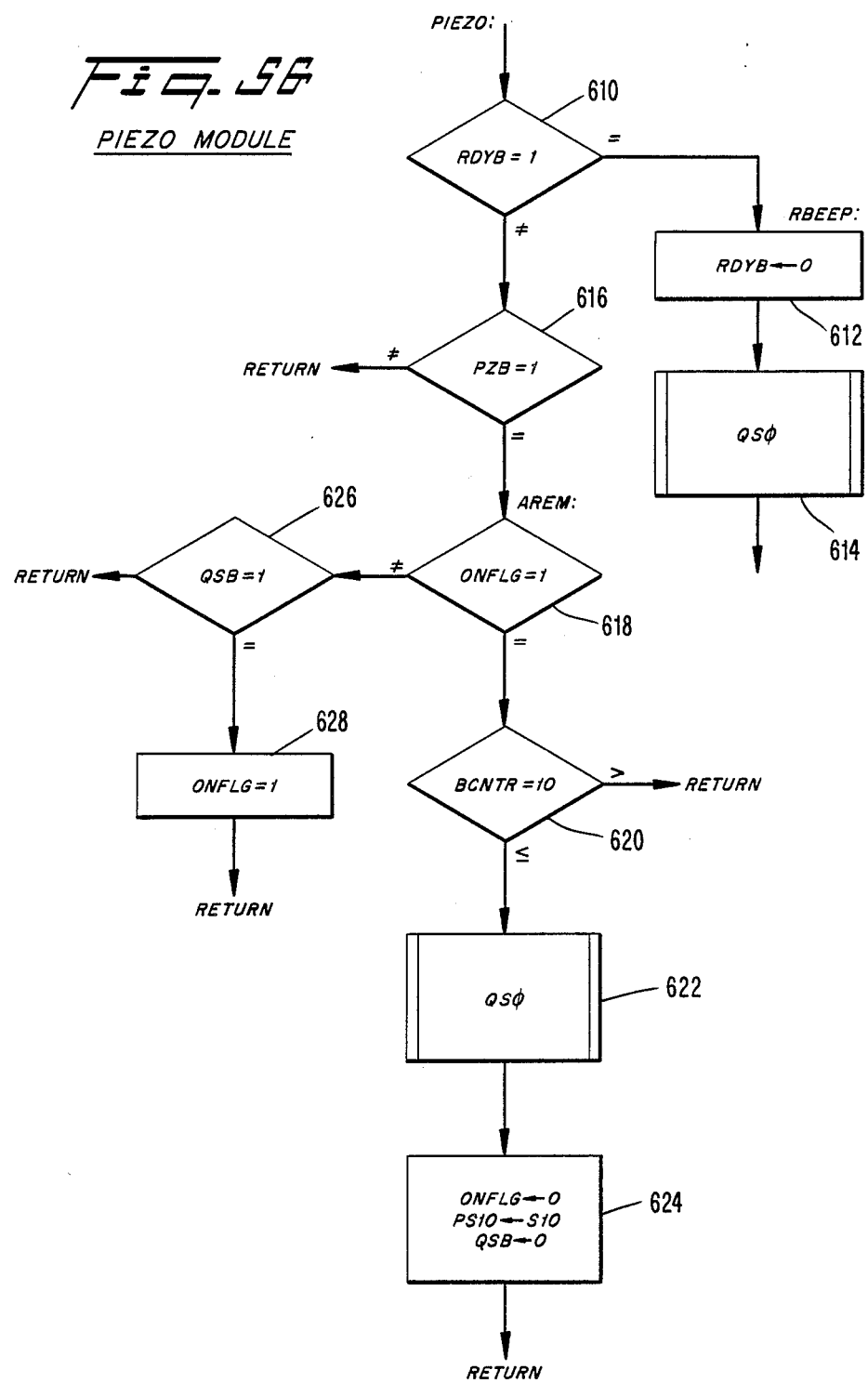

FIG. 5F is a logic flow diagram of the timer module indicated at block 318 of FIG. 4. At block 590, a determination is made if RESET flag RSTB supplied by the WAIT/READY module is set. If so, program control advances to block 592 where the indicated counters and flags are set and the timer module exited. Otherwise, program control advances to block 592 which determines if the PZB flag is set.

If the PZ2 is not set, then less than 10 minutes have passed and blocks 594–598 are thus executed. Block 594 sets up RAM to check for expiration of a 10 minute period. Block 596 performs a subtraction of the current pulse count. When 10 minutes have passed, block 598 is executed to set the PZB flag.

If the PZB flag is set at 592, then blocks 600–604 are executed. Block 600 sets up RAM to check expiration of a for 12 minute period, then block 602 performs a subtraction of the current pulse count. When 12 minutes have passed, routine SHOFF at block 604 is executed. This routine outputs a logic 1 on the microcomputer output 134 to turn off the triac 140 which deenergizes relay 52 and turns off the iron and circuit.

FIG. 5G is a logic flow diagram of the piezo module indicated at block 320 of FIG. 4. Block 610 determines if flag RDYB is set in order to provide the signal that the iron has reached the selected temperature. If so, block 612 resets the flag, and subroutine QSO 614 generates a ¼ second 2.5 KHz signal on the output 147 of the microprocessor to sound the audible transducer 36.

At block 616 it is determined if it is time to generate the 10 beep signal. Blocks 618, 626 and 628 determine when all ten beeps have occurred. Subroutine QSO at block 622 is again used to generate a ¼ second 2.5 KHz signal on output 147 to sound the audible transducer 36. Block 624 resets variables.

This completes the execution of the iron control program. If automatic shut-off has not been performed, the iron control program then returns to block 236 to begin another cycle. In this manner, microcomputer 54 repeatedly performs the instructions as described above to produce the desired operating features.

In another aspect of the invention, indicating apparatus for an associated appliance includes means for selecting a desired value of an operating parameter of the associated appliance. As embodied herein, the parameter value selecting means includes temperature select knob 12. The invention further includes means for controlling operation of the associated appliance. The control means includes an input terminal, and is operable upon interruption of a signal to the input terminal to generate an indication signal. As embodied herein, the control means includes microcomputer 54 having input terminal 128, microcomputer 54 activating WAIT LED 26 when an input signal to terminal 128 is interrupted. The invention further includes means connected to the input terminal and to the selecting means for detecting changes of the selecting means and for interrupting a signal to the input terminal whenever the selecting means is changed. As embodied herein, the change detecting means includes combination switch 122 connected to temperature select knob 12 which interrupts a signal to terminal 128 whenever temperature select knob 12 is changed.

It will be apparent to those skilled in the art that various modifications and variations can be made in the apparatus of the present invention without departing from the scope and spirit of the invention. For example, the invention may be used in conjunction with other types of appliances employing variable temperature heaters. Furthermore, other types of temperature sensing and heater control devices could be used, such as solid state temperature sensors and switching devices. Thus, it is intended that the present invention cover the modifications and variations of this invention provided they come within the scope of the appended claims and their equivalents.

I claim:

1. Indicating apparatus for an associated appliance having a variable temperature heater, comprising:
   means for selecting a desired temperature for the associated appliance;
   means for detecting changes in said temperature selecting means and for generating a first output signal whenever said temperature selecting means is changed by more than a predetermined amount;
   means for sensing the temperature of the associated appliance and for generating a temperature signal indicative of whether the associated appliance is above or below said desired temperature;
   means for detecting transitions of said temperature signal and for generating a second output signal when said sensing means senses that the temperature of the associated appliance has changed from below said desired temperature to above said desired temperature; and
   means connected to said change detecting means and said transition detecting means for generating a WAIT indication signal upon receipt of said first output signal and for generating a READY indication signal upon receipt of said second output signal.

2. Apparatus as recited in claim 1 wherein said indication signal generating means maintains a generated WAIT indication signal until receipt of said second output signal and maintains a generated READY indication signal until receipt of said first output signal.

3. Apparatus as recited in claim 2 wherein said indication signal generating means comprises a flip-flop circuit having an output terminal, a reset terminal connected to the output of said change detecting means, and a set terminal connected to the output of said transition detecting means, said flip-flop circuit generating said WAIT indication signal when said change detecting means supplies said first output signal to said reset terminal and generating said READY indication signal when said transition detector generates said second output signal.

4. Apparatus as recited in claim 3 further comprising means connected to said flip-flop output terminal for generating an audible signal when said flip-flop generates said READY indication signal.

5. Apparatus as recited in claim 4 further comprising: means for detecting use of the associated appliance and for generating a use signal upon detection of use of the associated appliance;
   means for deenergizing the associated appliance; and
   a timer circuit comprising means for generating regular clock pulses, an enable input terminal connected to said flip-flop output, a reset input terminal connected to said use detecting means, and an output terminal connected to said deenergization means, said timer circuit being enabled by said READY indication signal and accumulating pulses whenever said READY indication signal is being generated, said timer circuit generating an output signal to operate said deenergization means when said accumulated pulse count reaches a first predetermined limit value, and said timer circuit zeroing said accumulated pulse count upon receipt of said use signal.

6. Apparatus as recited in claim 5 wherein said timer circuit comprises a second output terminal connected to said audible signal generating means, said timer circuit comprising means for generating an output signal to activate said audible signal generating means whenever said accumulated pulse count reaches a second predetermined limit value less than said first predetermined limit value.

7. Apparatus as recited in claim 1 wherein said change detecting means comprises a switch which interrupts a signal when said temperature selecting means is changed.

8. Apparatus as recited in claim 1 wherein said transition detecting means and said indication signal generating means comprise a microcomputer.

9. A variable-temperature heating appliance, comprising:
   a heater;
   means for selecting a desired temperature for said appliance;
   means for detecting changes in said temperature selecting means and for generating a first output signal whenever said temperature selecting means is changed by more than a predetermined amount;
   means for energizing said heater when said appliance is below said desired temperature and for deenergizing said heater when said appliance is above said desired temperature;
   means for detecting transitions of said energizing means from an energizing condition to a deenergizing condition and for generating a second output signal when said energizing means changes from energizing said heater to deenergizing said heater; and
   means connected to said change detecting means and said transition detecting means for generating a WAIT indication signal upon receipt of said first output signal and for generating a READY indication signal upon receipt of said second output signal.

10. Apparatus as recited in claim 9 wherein said energizing means comprises a thermostat.

11. Apparatus as recited in claim 9 wherein said change detecting means comprises a switch producing an interrupted signal when said temperature selecting means is changed.

12. Apparatus as recited in claim 9 wherein said transition detecting means and said indication signal generating means comprise a microcomputer.

13. Indicating apparatus for an associated appliance, comprising:
   means for selecting a desired value of an operating parameter of the associated appliance;
   means for controlling operation of the associated appliance, said control means comprising an input terminal and operable upon interruption of a signal to said input terminal to generate an indication signal; and
   means connected to said input terminal and to said selecting means for detecting changes of said selecting means and for interrupting a signal to said input terminal whenever said selecting means is changed.

14. Apparatus as recited in claim 13 wherein said interrupting means comprises means for momentarily interrupting a signal to said input terminal whenever said selecting means is changed.

15. A variable-temperature portable electric iron, comprising:
   a heater;
   a temperature control knob;
   means for detecting changes in the setting of said temperature control knob and for generating a first output signal whenever said temperature control knob is changed by more than a predetermined amount;
   a thermostat coupled to said temperature control knob and said heater, and operable between conductive and non-conductive conditions;
   thermostat sensing means for generating a second output signal when said thermostat changes from a conductive condition to a non-conductive condition; and
   means connected to said change detecting means and said thermostat sensing means for generating a WAIT indication signal only upon receipt of said first output signal and for generating a READY indication signal only upon receipt of said second output signal.

16. Apparatus as recited in claim 15 wherein said change detecting means comprises a switch producing an interrupted signal when said temperature control knob is changed.

17. Apparatus as recited in claim 16 wherein said thermostat transition sensing means and said indication signal generating means comprise a microcomputer.

* * * * *